Jan. 26, 1932.  W. E. DEAN  1,842,508
PISTON RING DEVICE
Filed March 19, 1928
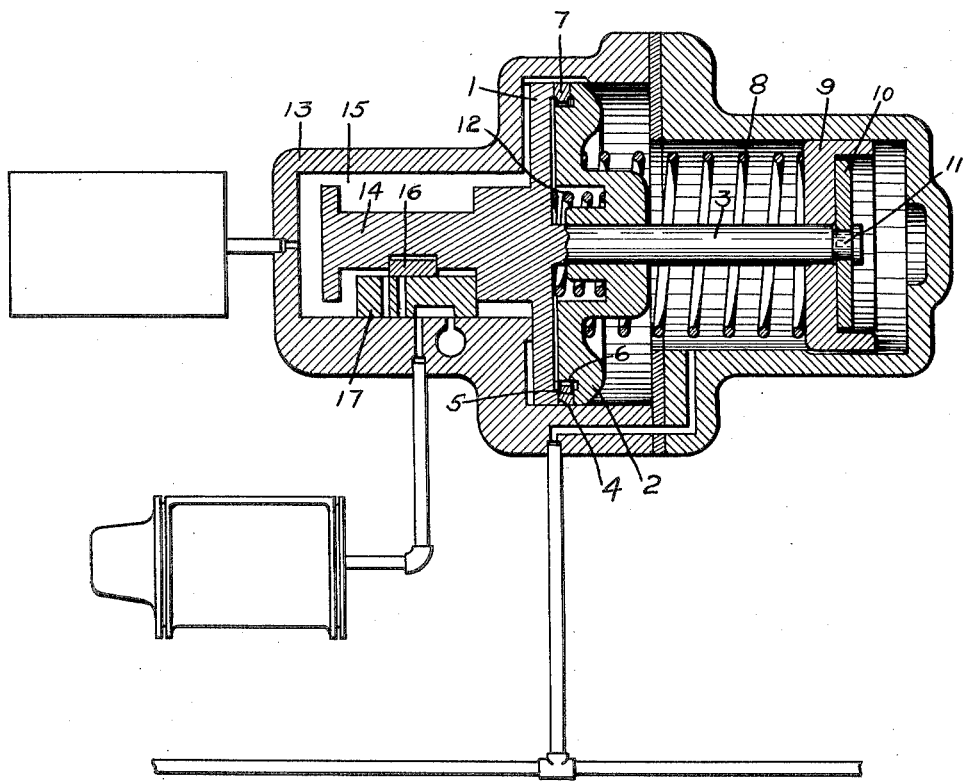
INVENTOR
WILLIAM E. DEAN
BY Wm. M. Cady
ATTORNEY Patented Jan. 26, 1932

1,842,508

UNITED STATES PATENT OFFICE

WILLIAM E. DEAN, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

PISTON RING DEVICE

Application filed March 19, 1928. Serial No. 262,887.

This invention relates to piston devices and more particularly to piston devices for use in fluid pressure systems.

The principal object of my invention is to provide a piston device in which the proper operative relationship between the piston and piston packing ring is maintained at all times, regardless of wear which may occur on the sides of the packing ring and the sides of the packing ring groove.

Another object of my invention is to provide a piston device in which wear of the cooperating bearing surfaces of the piston and piston packing ring is automatically taken up.

A still further object of my invention is to provide a piston device in which a graduating spring of a triple valve device may be utilized for the purpose of maintaining the proper operative relationship between two separable piston parts and the piston packing ring.

Other objects and advantages will appear from the following more detailed description of my invention.

In the accompanying drawing, the single figure is a diagrammatic view, partly in section, of a triple valve device embodying my invention.

As shown in the drawing, my improved piston device comprises discs 1 and 2 which are adapted to cooperate to form a piston. The disc 1 may be provided with a forwardly extending projection or stem 3 upon which the disc 2 is slidably mounted. Adjacent the periphery of the piston, the discs 1 and 2 are provided with annular bearing surfaces 4 and 5 respectively, and inwardly, slightly beyond the surfaces 4 and 5, is an annular shoulder 6 which may be integral with the disc 2 and which, together with the surfaces 4 and 5, define an annular groove for the reception of a packing ring 7. When the ring 7 is mounted in its proper position in the groove, the surface 4 will contact with one side of the ring and the surface 5 will contact with the other side, and there will be a space between the inner edge of the ring and the annular shoulder 6 of the disc 2, which space permits the ring 7 to contract freely. In assembling the piston and applying it to a cylinder, this shoulder 6 serves to maintain the ring 7 in position between the surfaces 4 and 5.

For the purpose of maintaining the proper bearing between the sides of the packing ring 7 and the surfaces 4 and 5, a spring 8 may be provided, one end of which is seated on the piston plate 2 and the opposite end is seated on a spring follower 9 mounted on the stem 3 of the piston plate 1, which follower is maintained on the stem by a split ring 10 which engages the stem within a groove 11 formed in the stem adjacent the forward end thereof.

The discs 1 and 2 are maintained in spaced relation to each other by their engagement with the ring 7, so that when wear occurs, the discs will be moved toward each other by the pressure of the spring 8, thus ensuring the proper bearing between the discs and the sides of the packing ring at all times.

While the discs 1 and 2 are maintained in close contact with the packing ring 7, the pressure of the discs on the ring must not be great enough to cause a binding action on the ring, but should permit substantially the same movement of the ring relative to the piston as is permitted in the ordinary piston construction.

In the present embodiment of the invention, a spring 12 is interposed between the discs 1 and 2, the pressure of which, acting against the disc 2, is adapted to prevent the pressure of the spring 8 from causing binding action between the discs and the ring 7.

In the drawing, my improved piston device has been illustrated as forming a part of a triple valve device for fluid pressure brake apparatus, which triple valve device comprises a casing 13. The chamber at one side of the piston contains the spring 8 and spring follower 9, said follower being guided by the casing and forming a guide for the piston. In this embodiment of the invention the spring 8 serves as a graduating spring to prevent the piston from accidentally moving to emergency position when a service reduction in brake pipe pressure is effected. The piston plate 1 in the present embodiment of the invention is provided with a rearwardly extending stem 14 which is contained in a chamber 15 at one side of the piston, said stem being adapted to operate the usual graduating and slide valves 16 and 17 respectively, contained in the chamber 14.

In some embodiments of my invention, the spring 8 may be of such capacity that there will be no danger of any objectionable binding action occurring between the ring 7 and the surfaces 4 and 5 of the piston plates 1 and 2 respectively, and in such embodiments the spring 12 may be omitted.

It will be noted from the foregoing description that, as the disc 2 is slidably mounted on the stem 3, the width of the packing ring groove may be varied to accommodate packing rings of different sizes without necessitating any special fitting operations.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a piston, the combination with a disc, of a stem on said disc, a disc loosely mounted on said stem, a packing ring slidably mounted between said discs and spacing said discs apart, means cooperating with said discs for maintaining them in contact with said ring, and means interposed between said discs for decreasing the pressure between said discs and ring.

2. In a piston, the combination with a pair of separable discs, of a packing ring slidably mounted between said discs, pressure means adapted to maintain said discs in contact with said ring, and means interposed between said discs for modifying the pressure between said discs and ring.

3. A piston comprising a pair of relatively movable discs adapted to cooperate to define a packing ring groove, a packing ring in said groove, a spring urging said discs into contact with said ring, and means interposed between said discs for modifying the pressure of said discs on said packing ring.

4. In a valve device, the combination with a casing, of a piston operatively mounted in said casing, said piston comprising a pair of discs, a packing ring operatively engaged by said discs, a graduating spring urging said discs into engagement with said ring, and means interposed between said discs for modifying the pressure of said discs on said ring.

5. In a valve device, the combination with a casing, of a piston operatively mounted in said casing, said piston comprising a disc having a forwardly extending stem, a disc loosey mounted on said stem, a spring follower on said stem, a packing ring interposed between said discs, and a graduating spring interposed between said follower and last mentioned disc adapted to maintain said discs in operative engagement with said ring.

In testimony whereof I have hereunto set my hand.

WILLIAM E. DEAN.